United States Patent [19]

Dalton et al.

[11] Patent Number: 4,463,164

[45] Date of Patent: Jul. 31, 1984

[54] PROCESS FOR PREPARING POLYPHENYLENE ETHERS

[75] Inventors: William O. Dalton; Michael K. Rinehart, both of Parkersburg, W. Va.; Akitoshi Sugio, Tokyo, Japan

[73] Assignee: Borg-Warner Chemicals, Inc., Parkersburg, W. Va.

[21] Appl. No.: 466,746

[22] Filed: Feb. 15, 1983

[51] Int. Cl.$^3$ .............................................. C08G 65/46
[52] U.S. Cl. ..................... 528/212; 526/68; 526/69; 526/70; 528/86; 528/214; 528/215; 528/217; 528/486; 528/487; 528/490; 528/496; 528/499; 528/502
[58] Field of Search ................ 528/212, 86, 486, 487, 528/490, 496, 499, 502, 214, 215, 217; 526/68-70

[56] References Cited

U.S. PATENT DOCUMENTS

| | | | |
|---|---|---|---|
| 3,219,626 | 11/1965 | Blanchard et al. | 260/47 |
| 3,306,874 | 2/1967 | Hay | 260/47 |
| 3,306,875 | 2/1967 | Hay | 260/47 |
| 3,789,054 | 1/1974 | Izawa et al. | 260/47 |
| 3,838,102 | 9/1974 | Bennett et al. | 260/47 |
| 4,011,200 | 3/1977 | Yonemitsu et al. | 260/47 |
| 4,039,510 | 8/1977 | Cooper et al. | 528/212 |
| 4,058,504 | 11/1977 | Yonemitsu et al. | 260/47 |
| 4,067,851 | 1/1978 | Tomita et al. | 260/47 |
| 4,088,634 | 5/1978 | Cooper et al. | 528/212 |
| 4,157,434 | 6/1979 | Floryan et al. | 528/212 |
| 4,211,857 | 7/1980 | Sugio et al. | 528/215 |
| 4,237,265 | 12/1980 | Eliassen et al. | 528/496 |
| 4,385,167 | 5/1983 | Floryan | 528/212 |

*Primary Examiner*—Lester L. Lee

[57] ABSTRACT

An improved method for the production of polyphenylene ethers is disclosed. The method comprises oxidatively coupling monohydric phenols in the presence of a complex catalyst and in a liquid medium which is a solvent for the monomer and catalyst and a non-solvent for the polyphenylene ether. The polyphenylene ether precipitates to form a slurry of particulate solids which is then washed with an aqueous solution of a chelating agent to remove catalyst residue.

20 Claims, No Drawings

PROCESS FOR PREPARING POLYPHENYLENE ETHERS

BACKGROUND OF THE INVENTION

This invention relates to an improved process for the production of polyphenylene ethers and more particularly to a precipitation process for the production of polyphenylene ethers from monohydric phenols by oxidative coupling.

Processes for producing polyphenylene ethers from 2,6-disubstituted phenols by oxidative coupling have long been known, including, for example, those disclosed in U.S. Pat. Nos. 3,306,874 and 3,219,626. More recently, the preparation of phenylene ether copolymers was disclosed in U.S. Pat. No. 4,011,200, and an improved catalyst system useful in the preparation of polyphenylene ethers was disclosed in U.S. Pat. No. 4,067,851.

Oxidative coupling polymerizations are generally carried out in the presence of a good solvent for the monomers and the polyphenylene ether and at concentrations that will result in a homogeneous polymer solution. It has long been known that these polymerizations could also be carried out in a medium which dissolves the monomer and catalyst but not the polyphenylene ether so that the high molecular weight polymer precipitates as it forms, as is shown in Example 27 of U.S. Pat. No. 3,306,875. As a practical matter however, polymerization in a good solvent had heretofore been thought necessary in order to afford means for removing catalyst residues and other impurities. According to a variety of references including U.S. Pat. No. 3,838,102, allowing the polyphenylene ether to precipitate in the presence of the catalyst results in a solid particulate polymer contaminated with catalyst residues which are very difficult to remove, with the result that the polymer exhibits instability and poor color. Further, as taught for example in U.S. Pat. No. 4,058,504, homogenious polymerization schemes allow better control of molecular weight in the final product.

The prior art has therefore tended to prefer processes for polyphenylene ether production that provide a homogeneous solution into which reaction-terminating compounds may be readily added to control final molecular weight and which may then be readily extracted with suitable immiscible compositions to remove the catalysts prior to precipitation of the polyphenylene ether. Although these homogeneous processes are quite successful commercially, there are disadvantages. It is necessary to avoid a highly viscous and difficult to handle reaction mixture by limiting the concentration of polymer in the final solution. Also, precipitation of the polymer from the homogeneous mixture after extraction of the catalyst residues presents a further practical problem. In general, precipitation is accomplished by mixing the polymer solution with a miscible non-solvent such as an alcohol, then filtering or centrifuging the mixture to recover the solid polymer. The solvent mixture cannot be re-used without a costly and technically undesirable fractional distillation to separate the solvent and precipitant.

Processes for a precipitation polymerization of monohydric phenols are also known in the art. For example, in U.S. Pat. No. 3,789,054, there was disclosed a two stage process in which the oxidative coupling of the phenols is carried out in a medium consisting of a solvent which will not dissolve the polymer after it attains a significant molecular weight (specific viscosity>0.25). The solid particulate polymer produced in such processes is typically first separated from the media by centrifugation and/or filtration, then washed as a solid. Although no particular method is disclosed for washing the filtered polymer, the need for extensive washing to remove catalyst residues will be apparent from the teachings of the references previously discussed. The polymerization art to this time has not found a practical means to accomplish the necessary removal of catalyst residues from the precipitated polymer. For that reason, no commercially attractive precipitation polymerization scheme for the production of polyphenylene ethers is known.

SUMMARY OF THE INVENTION

This invention is a precipitation process for the production of polyphenylene ethers which may generally be described as comprising the steps of carrying out the oxidative coupling of at least one monohydric phenol in the presence of a catalyst comprising a copper salt and an amine and in a liquid medium immiscible with water, said medium being a poor solvent for the polyphenylene ether, to produce a slurry of solid particulate polyphenylene ether dispersed in the liquid medium followed by washing the slurry with an aqueous solution of aminocarboxylic acid-type chelating agent to extract the catalyst residue.

After extracting the catalyst residue, the slurry may be filtered or centrifuged to collect the solid polyphenylene ether. The liquid media is then free of solids and may be re-used in the polymerization without the need for fractional distillation.

DETAILED DESCRIPTION

The monohydric phenols useful in preparing polyphenylene ethers according to the practice of this invention include 2,6 disubstituted phenols, 2,3,6-trisubstituted phenols, and mixtures thereof. The monohydric phenols may be represented by 2,6-dimethylphenol, 2-methyl-6-ethylphenol, 2,6-diethylphenol, 2,3,6-trimethylphenol, 2-methoxy-3,6 dimethylphenol and the like.

The catalyst systems useful in the practice of this invention may be any of the copper-amine complex catalysts employed in the prior art for the oxidative coupling polymerization of monohydric phenols. Particularly useful are those disclosed in U.S. Pat. No. 4,067,851, which are described therein as consisting of a copper compound other than cuprous chloride or cuprous bromide, a primary amine and iodine or an iodine-containing compound. Typical copper compounds include curpic chloride, cupric bromide, cuprous sulfate, cupric sulfate, cuprous sulfide, cupric sulfide, cuprous oxide, cupric oxide, cuprous acetate, cupric propionate, cupric butyrate, cupric benzoate, basic cupric carbonate, basic cupric acetate, cupric nitrate, cuprous iodide, cuprous cyanide, cupric thiocyanate, etc. The iodine containing compound may be iodine, hydrogen iodide, an alkali metal iodide or an alkyl iodide. Cuprous iodide is regarded as providing both the copper compound and iodine compound, and is a surprisingly effective catalyst in the presence of the primary amine. The primary amines disclosed as being useful include aliphatic monoamines, cycloaliphatic monoamines and mixtures thereof such as, for example, the $C_1$ to $C_{12}$ aliphatic primary amines methylamine, ethylamines, propylamine, butylamine, hexylamine, laurylamine and the like, aralkyl primary amines such as benzylamine, beta-phenethylamine and the like, and cycloaliphatic amines such as cyclohexylamine.

The amount of each catalyst component that may be used will vary widely, however, it is preferred that the amount of copper compound employed lie in the range of 0.1 to 10, preferably 0.1–3%, by weight based upon the weight of monohydric phenols employed, while the amount of iodine compound be in the range of from 10 to 100 mole percent of the total moles of copper compound employed. The amount of amines employed will be at least one equivalent for each mole of the copper compound, however from 1 to 50, preferably from 3 to 30% by weight based on the amount of liquid medium employed has been found to be partical.

The polymerization is carried out in a liquid medium immiscible with water and comprising a mixture of a solvent for the polyphenylene ether and a non-solvent. The liquid media will thus have good solvent ability for the monomers, for the catalyst system and for low molecular weight oligomers but be a poor solvent for high molecular weight polyphenylene ether, causing the polymer to precipitate as it reaches the limiting molecular weight.

As suitable solvents, a wide variety of liquids are known including aromatic hydrocarbons, certain halogenated aliphatic compounds such as chloroform and the like, however, aromatic hydrocarbons such as benzene, toluene and xylene are preferred. Although a variety of non-solvents are also known including the lower alcohols, aliphatic nitriles, glycols, ethers, ketones, aliphatic hydrocarbons, and the like, the most effective and least likely to interact in the polymerization scheme and thus preferred are $c_3$–$c_{10}$ aliphatic hydrocarbons including pentane, hexane, heptane, octane and the like. Included are the normal alkanes and cycloalkanes as well as the isomeric alkane mixtures of aliphatic hydrocarbons widely available commercially. It will be recognized that the very low boiling hydrocarbons such as propane and butane could also be employed provided that the polymerization were carried out in a pressurized vessel.

The volume ratio of aromatic hydrocarbon solvent to aliphatic hydrocarbon non-solvent will vary in the range of from 10:1 to 1:10, preferably in the range of from 3:2 to 1:4. The particular ratio employed will be selected from within that range according to the particular molecular weight solubility limit desired. At a ratio of 10:1, the weight average molecular weight of precipitated polymer will exceed 150,000, while at a ratio of 1:10 the molecular weight may be undesirably low and unsuited for most applications.

The oxidizing agent employed may be oxygen gas, oxygen mixed with an inert diluent gas, air and the like as is well known in the art.

The polymerization step is carried out by charging a portion of the liquid media and the catalyst components to a stirred reactor, then adding the monohydric phenols dissolved in a further portion of the liquid media. Oxygen-containing gas is passed into the stirred reactor to effect the oxidative coupling polymerization, and stirring is maintained at a rate which will disperse the oxygen gas and suspend the polyphenylene ether as it precipitates. The polymerization reaction is strongly exothermic, and the reactor will necessarily be cooled to remove the heat of polymerization.

The polymerization may be carried out at any convenient temperature in the range of from 0° C. to the boiling point of the mixture, however, a temperature in the range 15°–55° will be preferred. It is advantageous to fit the reactor with a chilled reflux condenser through which the gases are discharged, so that water formed in the reaction, solvent and amine may be condensed from the gas stream as is taught in U.S. Pat. No. 4,211,857.

The reaction rate may be controlled by controlling the flow rate of the oxygen gas, and if desired, by adding the monohydric phenols slowly and over a period of time rather than in a single charge. The concentration of monohydric phenols will lie in the range of 5–20 wt%, based on total reactor charge. In as much as the polymer precipitates from solution upon attaining the limiting molecular weight, the mixture does not become highly viscous until a substantial amount of precipitated solids are present in slurry form. It is thus possible to employ considerably greater concentrations of monomers in the instant precipitation process than would be possible in an homogeneous process, which has significant commercial advantages. As a practical matter, above a level of about 20 wt% solids, the resulting slurry becomes difficult to transfer for further processing.

The reaction time will vary depending upon the particular set of conditions employed. Unlike prior art homogeneous polymerization processes, the final molecular weight of the polyphenylene ether produced in this process will be determined by the degree of polymerization attained before the polymer precipitates. Chain growth occurs only very slowly after precipitation, hence variations in reaction time beyond the initial formation of precipitated polymer will primarily affect the degree of conversion or polymer yield and have very little affect on the nature of the polymer produced.

Upon completing the polymerization, either by exhausting the supply of monomer, or by ending the addition of the oxygen-containing gas such as by removing the mixture from the reactor, the polymer exists as a finely divided particulate solid dispersed or suspended in the reaction medium as a slurry. The slurry is then repeatedly washed with from 0.1 to 2.0 volumes of an aqueous solution comprising water and an aminocarboxylic acid-type chelating agent to remove the catalyst residues.

The chelating agents useful in the practice of this invention are polyalkylene polyamine polycarboxylic acids such as, for example, ethylene diamine tetraacetic acid (EDTA) and its salts, nitrilotriacetic acid and its salts and diethylene triamine pentaacetic acid and its salts. These compounds are among those disclosed in U.S. Pat. No. 4,058,054 for use with reducing agents in a process for terminating polyphenylene ether reactions. The aqueous washing solution employed in this process will comprise from 0.05 to 5 wt% of aminocarboxylic acid-type chelating compound. It will be understood that the total amount of chelating compound employed in the washing will necessarily be at least 1 mole per mole of copper present in the polymer, hence the use of a more concentrated solution will reduce the volume of wash solution to be employed.

The aqueous solution may further comprise from 0.1 to 5 wt% of a reducing compound such as sodium thiosulfate, various soluble sulfite, bisulfite or dithionite salts or the like. These reducing compounds have little effect on copper removal but appear to favorably affect the color of the final polymer.

The washing may be accomplished by thoroughly mixing the slurry and the aqueous solution, allowing the mixture to separate into aqueous and organic phases, and removing the aqueous phase. The finely-divided solid polymer remains suspended as a stable slurry in the organic reaction medium through repeated washings.

The surprising aspect of this process step is that copper can be removed from the solid particles very effectively with an aqueous solution of chelating agent. In prior art precipitation processes, the practice was to separate the particulate solid polymer from the organic liquid and wash the solid repeatedly with aqueous acid, or in the alternative, to dissolve the polymer and extract or reprecipitate the polymer to remove the catalyst residues.

The washing step may be accomplished in a batch manner as described above, or in a continuous manner by introducing the washing solution and the slurry into a stirred or rotating plate counter-current extraction vessel. A variety of suitable counter-current extractors is known in the process art and the use of these extractors will be apparent. Agitation during the counter-current extraction is necessary, but extreme agitation or sheer will cause emulsification and hence is to be avoided. The washing may be carried out at any convenient temperature in the range of from about 0° C. to the boiling temperature of the slurry.

Whether done by batch or by continuous extraction, the washed slurry after separation from the aqueous component may be processed in any convenient, conventional manner such as filtration or by centrifuge to recover the solid polymer. The recovered organic phase after removal of the solid polymer comprises the solvent/non-solvent mixture and is substantially free of copper salts. The organic phase may further comprise soluble low molecular weight oligomers and, where amines having low water solubility are employed, all or most of the amine component of the catalyst. The organic phase may be returned to the reactor without further purification for use as the reaction medium in a subsequent polymerization, or flash-distilled before reuse if desired to remove the low molecular weight oligomer fraction.

The process of this invention may be carried out in the batch manner described above, or adapted to be run in a continuous manner. In as much as moderate variations in reaction time do not determine the final molecular weight of the precipitated polymer, and since the washing step affords—after removal of solid polymer—a solvent/non-solvent mixture substantially free of interfering contaminants, a continuous flow process can be carried on wherein a monomer solution is continuously added to the reactor, slurry is continuously removed from the reactor, counter-currently washed, filtered or centrifuged to separate out the medium and the medium is returned to the reactor, together with catalyst components as necessary.

The practice of this invention will be better understood by consideration of the following examples, which are provided by way of illustration of the instant invention and not in limitation thereof. In these Examples, all parts are by weight.

EXAMPLE 1

Semi-Batch Precipitation Polymerization

An initial charge consisting of 177.9 parts toluene, 268.4 parts n-octane, 0.514 parts CuI, and 93.80 parts n-hexylamine was added to a baffled, stirred reactor and heated to 40° C. Air was bubbled through a nozzle near the bottom of the reactor at a rate of 3.38 parts per minute and the contents in the reactor were then agitated at 1200 rpm to obtain good air dispersion. The air was allowed to exit the reactor through a condenser and the condensed vapor was collected in a trap. A monomer solution composed of 175.9 parts toluene, 264.7 parts n-octane, and 100.0 parts 2,6 dimethylphenol was added over a period of 40 min. Heavy precipitation of polyphenylene ether began fifteen minutes after the completion of monomer addition. The reaction was terminated 90 min. after monomer addition was completed, and the solid particulate polyphenylene ether was collected by filtration in 98% yield. The polymer had a number average molecular weight ($M_n$) of 17,800 and a weight average molecular weight ($M_w$) of 49,700.

EXAMPLE 2

Effect of Solvent/Non-Solvent Ratio on Molecular Weight

An initial charge consisting of 253.4 parts toluene, 205.3 parts n-octane, 0.513 parts CuI, and 93.73 parts n-hexylamine was added to a reactor and heated to 40° C. Air was bubbled through the reactor contents at a rate of 3.83 parts per minute. The reaction apparatus was similar to that described in Example 1 except that the reactor was not baffled. A monomer solution containing 251.3 parts toluene, 203.6 parts n-octane, and 100.0 parts 2,6 dimethylphenol were added to the reactor, following the procedures of Example 1. The total amounts of toluene and n-octane used in this reaction correspond to a 50/50 volume ratio (1.23/1 wt. ratio) of toluene to n-octane. The precipitated polyphenylene ether had an $M_n$ of 31,000 and an $M_w$ of 145,000.

EXAMPLES 3-8

The procedure of Example 2 was followed in Examples 3-8, but varying ratios of toluene and octane were employed to establish the effect on molecular weight. The results are summarized in Table I.

TABLE I

| Ex No | Volume Ratio Toluene/n-Octane | Mn | Mw |
|---|---|---|---|
| 2 | 50/50 | 31,000 | 145,000 |
| 3 | 45/55 | 25,100 | 94,100 |
| 4 | 40/60 | 20,400 | 66,600 |
| 5 | 35/65 | 18,500 | 54,100 |
| 6 | 30/70 | 15,600 | 42,100 |
| 7 | 20/80 | 14,300 | 29,100 |
| 8 | 0/100 | 13,200 | 24,500 |

EXAMPLE No. 9

Continuous Precipitation Polymerization

A jacketed, insulated, one liter resin kettle equipped with a reflux condenser and a Dean-Stark trap was charged with 536 mls of n-octane, 288 mls of toluene, and 0.22 gm of copper iodide dissolved in 176 mls of n-hexylamine. Air was injected into the mixture through a nozzle at 2100 cc/minute as the temperature was increased to 40° C. in order to remove initial water. For high shear agitation, the reactor was filled with four baffles and two six bladed, radial flow turbines driven at 1200 RPM. When the temperature of the mixture reached 40° C., the following feed streams were initiated:

a. A mixture of 666 parts of 2,6-dimethylphenol, 35 parts of 2,3,6-trimethylphenol, 414 parts of toluene, and 624 parts of n-octane was fed into the reactor at the rate of 138 mls/hour by means of a metering pump.
b. A mixture of 332 parts of hydrocarbon recycle (see below) and 0.61 parts of copper iodide dissolved in 14.9 parts of n-hexylamine was fed into the reactor at 462 mls/hour by means of a metering pump.

The product slurry was removed with a transfer pump. The removal rate used maintained the starting volume in the reactor with 100 min. hold-up time.

The slurry was pumped through a countercurrent wash tower to remove the copper catalyst. The slurry was tapped continuously from the head of the wash tower and collected in one hour increments. The resin was removed from the washed slurry by vacuum filtration. After removing a 20 percent purge, the hydrocarbon filtrate was stripped to less than 0.05 percent water, adjusted to the correct level of each component using gas chromatograph data, and returned as feed stream b. A mixture of 269 parts of n-hexylamine, 754 parts of n-octane, and 499 parts of toluene was used as feed stream b until the first batch of hydrocarbon recycle was collected and prepared. The continuous process was carried out for 24 hours, and provided granular copolymer of 2,6 dimethylphenol and 2,3,6-trimethylphenol in a yield of 97±2%. The product molecular weight was approximately 59,000 (Mw) as determined by high performance size exclusion chromatography.

EXAMPLE No. 10

Multiple Batch Washing

Copper removal from 100 parts of an unwashed phenylene ether copolymer (PEC) resin slurry prepared as in Example 9 and having approximately 520 ppm copper in the resin was accomplished by mixing the slurry with 15 parts wash solution in a beaker for one hour at room temperature using magnetic stirrer bar agitation. The wash solution was 1.7 parts sodium (tetra) ethylenediamine tetraacetate and 1.2 parts sodium hydrosulfite dissolved in 100 parts demineralized water. After the washing was completed, the slurry was allowed to phase separate in a 250 milliliter separatory funnel. The wash phase (bottom layer) was discarded. The washing procedure was repeated twice. The resin after collection and drying at 60° C. in a vacuum oven, was light yellow-brown and contained 7 ppm copper (as Cu).

EXAMPLE NO. 11

Multiple Batch Washing with EDTA-Na4

The unwashed PEC slurry (100 parts) of Example 9 was washed twice with a wash solution of 1.7 parts sodium (tetra) ethylenediamine tetraacetate dissolved in 100 parts demineralized water, then a third time with the wash solution of Example 10, following the procedures of Example 10. The dried resin had 5 ppm copper and was light yellow-brown.

EXAMPLE NO. 12

Copper Removal via Countercurrent Wash Tower

A countercurrent wash tower was constructed with six stirred chambers of 120 milliliters capacity, each chamber being stirred with an axial flow turbine driven at 280–300. A 40° C. slurry temperature was maintained. PEC resin slurry (Example 9) with approximately 1040 ppm copper in the resin was pumped into the bottom stirred chamber at the rate of 600 mls/hr and removed from the "dead zone" above the top plate. At this flow rate the tower hold-up time for the slurry was approximately 90 minutes. Wash solution containing 1.7 parts sodium (tetra) ethylenediamine tetraacetate and 1.2 parts sodium hydrosulfite dissolved in 100 parts demineralized water was pumped at the rate of 240 mls/hr into the top stirred chamber and removed from the "dead zone" below the bottom plate. The resin was collected by vacuum filtration and dried for approximately 48 hrs at 60° C. in a vacuum oven. The copper content of the dried resin (three collections) lie in the range 4–6 ppm.

EXAMPLE NO. 13

Continuous Precipitation Polymerization

The reactor described in Example 9 was charged with 588 mls of n-heptane, 317 mls of toluene, and 0.14 gm of copper iodide dissolved in 95 mls of n-butylamine. Water was removed from the reactor by recycling the stripped headspace atmosphere, and air was injected into the mixture through a nozzle at 1400 cc/minute and vented through a second reflux condenser. When the temperature of the mixture reached 40° C., the following feed streams were initiated.
a. A mixture of 328 parts of 2,6-dimethylphenol, 17 parts of 2,3,6-trimethylphenol, 226 parts of toluene, and 331 parts of n-heptane was fed into the reactor at the rate of 121 mls/hour by means of a metering pump.
b. 365 mls/hour of hydrocarbon recycle (see below) were fed into the reactor by means of a metering pump.
c. A mixture of 3.5 parts copper iodide dissolved in 105 parts of n-butylamine was fed into the reactor at the rate of 14 mls/hour by means of a metering pump.

The product slurry was removed with a transfer pump, maintaining the starting volume in the reactor with 120 min. hold-up time.

The slurry was washed and the resin was isolated and dried as in Example No. 9. After removing the 20 percent purge, the filtrate was adjusted to the correct level of each component using gas chromatograph data and returned as fed stream b. A mixture of 110 parts of n-butylamine, 663 parts of n-heptane, and 453 parts of toluene was used as feed stream b until the first batch of hydrocarbon recycle was collected and prepared. The continuous process was carried out for 64 hrs., and provided granular copolymer of 2,6-dimethylphenol and 2,3,6-trimethylphenol in 96.8±3.1% yield. The molecular weight was approximately 49,000 (Mw) as determined by high performance size exclusion chromatography.

It will be apparent from the foregoing examples that the process of this invention is effective in producing polyphenylene ether resins of useful and controlled molecular weight and with a very low contamination by catalyst residues. Whether run in a batch or continuous manner, the copper contamination is readily reduced to below 10 ppm, and may be as low as 4 ppm. It is surprising that washing the slurry with an aqueous wash solution can effectively remove catalyst residues from the precipitated polymer. The prior art suggests only that reprecipitation or extensive washing of the filtered polymer with solvent, with water or with acidic mixtures, is necessary to remove catalyst residues. In a comparative Example using these prior art methods, a precipitated polymer having >500 ppm copper content was filtered. The filter cake was washed repeatedly with 10 volumes of water, and with 10 volumes of octane. The amount of copper present in the water and in the octane was negligible. In further comparative examples, a slurry was filtered to provide a filter cake of precipitated polymer having 711 ppm copper contamination. A portion of the filter cake was washed on the filter with 5.7 times its weight of a solvent mixture containing 10.4 volume % n-butylamine and toluene and heptane in a 40/60 volume ratio. The washed filter cake had 541 ppm copper contamination. A second portion of the filter cake was washed on the filter with 5.7 times its weight of an aqueous solution containing 2 pbw sodium (tetra) ethylene diamine tetraacetate and 2 pbw sodium hydrosulfite. The washed filter cake had 425 ppm copper. Multiple washings of the filter cake according to the prior art, whether with solvents, solvent-amine mixtures or aqueous wash solutions, is clearly very limited in effectiveness.

In still further comparative washing examples, a filter cake having 950 ppm copper contamination was re-slurried in a solvent mixture containing 10.4 volume % n-butylamine and toluene and heptane in a 40/60 volume ratio, then filtered. A twice-slurried sample had 318 ppm copper contamination, while a sample slurried four times had 150 ppm copper contamination. An equivalent filter cake (950 ppm copper), after twice being reslurried in methanol and filtered, had a copper contamination of 657 ppm. Washing the precipitated polymer as a filtered cake or re-slurrying the filtered polymer in fresh solvents will clearly be ineffective for removing catalyst contamination without resort to very extensive washing and is commercially impractical. Washing the polymer slurry according to teachings of this invention is clearly advantageous and provides a commercially practical precipitation process for the polymerization of monohydric phenols.

The process of this invention has clear advantages over prior art polymerization processes in that it may be carried out in a continuous manner, and it avoids the need for an expensive and highly energy-intensive fractional distillation of the polymerization solvent prior to re-use. As indicated above, the solvent/non-solvent mixture may be re-used without further purification or it may be flash distilled wholly or in part to remove accumulated by-products, which requires far less energy than does a fractionation process. Prior art precipitation polymerization processes have required extensive washings of the polymer after isolation by filtration. As shown above, these processes are clearly inferior in removing copper from the polymer.

It will be understood by those skilled in the art that the process of this invention as set forth above may be run in a batch, semi-batch or continuous fashion and at atmospheric, reduced or elevated pressures or otherwise modified without departing from the spirit of this invention. Although the process is described in the Examples in connection with particular reactors and process equipment, it is not intended that the invention be limited thereby, and other departures may be made within the scope of the following claims.

We claim:

1. A process for producing a polyphenylene ether comprising the steps of:
   a. oxidatively coupling monohydric phenols in a polymerization reactor in the presence of a complex catalyst comprising a copper salt and an amine in a liquid medium immiscible with water, said liquid medium being a solvent for said monohydric phenols and a poor solvent for said polyphenylene ether, and allowing the polyphenylene ether to precipitate to form a slurry in said medium;
   b. washing said slurry with an aqueous solution comprising water and from 0.05 to 5 wt% of a chelating agent; and
   c. separating the aqueous solution from said slurry.

2. The process of claim 1 wherein said liquid medium comprises a solvent for the polyphenylene ether and a non-solvent.

3. The process of claim 1 wherein said liquid medium comprises a solvent for the polyphenylene ether selected from the group consisting of chlorinated hydrocarbons and aromatic hydrocarbons, and as a non-solvent an aliphatic hydrocarbon.

4. The process of claim 1 wherein said liquid medium comprises at least one aromatic hydrocarbon and at least one aliphatic hydrocarbon.

5. The process of claim 1 wherein the liquid medium comprises at least one aromatic hydrocarbon selected from the group consisting of benzene, toluene and xylene and at least one aliphatic hydrocarbon selected from the group consisting of $C_2$ to $C_{10}$ alkanes.

6. The process of claim 5 wherein the aromatic hydrocarbon and aliphatic hydrocarbon is employed in a volume ratio of from 10:1 to 1:10.

7. The process of claim 1 wherein the chelating agent is an aminocarboxylic acid-type chelating agent.

8. The process of claim 1 wherein the aqueous solution comprises from 0.1 to 5 wt% aminocarboxylic acid-type chelating agent.

9. The process of claim 1 wherein the aqueous solution comprises from 0.1 to 5 wt% aminocarboxylic acid-type chelating agent selected from the group consisting of ethylene diamine tetraacetic acid, diethylene triamine pentaacetic acid, nitrilotriacetic acid, and salts thereof.

10. The process of claim 1 wherein the aqueous solution further comprises from 1 to 5 wt% of a reducing compound.

11. The process of claim 1 wherein the aqueous solution further comprises from 1 to 5 wt% soldium hydrosulfite.

12. The process of claim 1 further comprising the step of separating the precipitated polyphenylene ether in said slurry from the medium and returning at least a portion of the separated medium to the reactor.

13. The process of claim 12 wherein said separated medium is distilled.

14. A process for producing a polyphenylene ether comprising the steps of:
   a. oxidatively coupling monohydric phenols in a polymerization reactor in the presence of a complex catalyst comprising a copper salt and an amine in a liquid medium comprising at least one aromatic hydrocarbon and at least one aliphatic hydrocarbon and allowing the polyphenylene ether to precipitate to form a slurry in said medium;
   b. washing said slurry with an aqueous solution comprising from 0.1 to 5 wt% of an aminocarboxylic acid-type chelating agent;
   c. separating the aqueous solution from said slurry; and
   d. separating the precipitated polyphenylene ether in said slurry from the medium.

15. The process of claim 14 wherein at least a portion of said medium is returned to the polymerization reactor.

16. The process of claim 14 wherein at least a portion of said medium is distilled.

17. The process of claim 14 wherein the liquid medium comprises at least one aromatic hydrocarbon selected from the group consisting of benzene, toluene and xylene and at least one aliphatic hydrocarbon selected from the group consisting of $C_2$ to $C_{10}$ alkanes.

18. The process of claim 14 wherein said chelating agent is selected from the group consisting of ethylene diamine tetracarboxylic acid, nitrilotriacetic acid, diethylene triamine pentaacetic acid and salts thereof.

19. The process of claim 14 wherein said aqueous solution further comprises from 1 to 5 wt% of a reducing compound.

20. The process of claim 14 wherein said aqueous solution further comprises from 1 to 5 wt% of sodium hydrosulfite.

* * * * *